(12) United States Patent
Srivastava et al.

(10) Patent No.: US 12,118,315 B2
(45) Date of Patent: Oct. 15, 2024

(54) EVENT INTENSITY ASSESSMENT

(71) Applicant: INTERNATIONAL BUSINESS MACHINES CORPORATION, Armonk, NY (US)

(72) Inventors: Biplav Srivastava, Rye, NY (US); Javid Huseynov, Montvale, NJ (US); Anushree B. Mehta, White Plains, NY (US); Po-Hao Huang, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 329 days.

(21) Appl. No.: 17/563,376

(22) Filed: Dec. 28, 2021

(65) Prior Publication Data

US 2023/0206001 A1 Jun. 29, 2023

(51) Int. Cl.
| | |
|---|---|
| *G06F 40/30* | (2020.01) |
| *G06F 3/14* | (2006.01) |
| *G06F 40/211* | (2020.01) |
| *G06F 40/279* | (2020.01) |
| *G06N 5/04* | (2023.01) |
| *G08B 21/18* | (2006.01) |

(52) U.S. Cl.
CPC .............. *G06F 40/30* (2020.01); *G06F 3/14* (2013.01); *G06F 40/279* (2020.01); *G06N 5/04* (2013.01); *G08B 21/182* (2013.01); *G06F 40/211* (2020.01)

(58) Field of Classification Search
CPC .......... G06F 40/30; G06F 3/14; G06F 40/279; G06N 5/04; G08B 21/182
See application file for complete search history.

(56) References Cited

U.S. PATENT DOCUMENTS

| | | | |
|---|---|---|---|
| 8,700,294 B2 | 4/2014 | Downs et al. | |
| 8,930,123 B2 | 1/2015 | Srivastava | |
| 9,047,495 B2 | 6/2015 | Miller et al. | |
| 9,182,751 B1 * | 11/2015 | Reeder | G08B 21/182 |
| 10,929,859 B2 | 2/2021 | Zhao et al. | |

(Continued)

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

(Continued)

*Primary Examiner* — Bhavesh M Mehta
*Assistant Examiner* — Darioush Agahi
(74) *Attorney, Agent, or Firm* — CUENOT, FORSYTHE & KIM, LLC

(57) ABSTRACT

Event intensity assessment can include detecting an event description within textual input received via a data communication network. An event-correlated data structure based on the event can be generated, the event-correlated data structure including an event descriptor corresponding to the event. An event sentiment can be determined based on the event descriptor and an event impact based on a quantitative temporal-spatial measure corresponding to the event. An event intensity can be determined based on the event sentiment and event impact. A GUI can be modified in response to the event intensity exceeding a predetermined threshold. The GUI can be modified to indicate the event and the event intensity.

20 Claims, 8 Drawing Sheets

(56) References Cited

U.S. PATENT DOCUMENTS

| | | | |
|---|---|---|---|
| 10,972,928 B2 | 4/2021 | Hicks et al. | |
| 2005/0140525 A1 | 6/2005 | Tomita et al. | |
| 2011/0125553 A1 | 5/2011 | Mazzoleni et al. | |
| 2013/0268196 A1* | 10/2013 | Dam | G01W 1/10 |
| | | | 702/3 |
| 2013/0289364 A1* | 10/2013 | Colman | A61M 16/0463 |
| | | | 600/301 |
| 2014/0098123 A1 | 4/2014 | Daynes et al. | |
| 2017/0161755 A1* | 6/2017 | Zhao | G06Q 30/0201 |
| 2020/0066257 A1* | 2/2020 | Smith | G06F 17/18 |
| 2020/0192981 A1* | 6/2020 | Fox | G06F 40/30 |
| 2020/0235764 A1* | 7/2020 | Patton | G06F 16/29 |
| 2022/0293107 A1* | 9/2022 | Leaman | G06F 16/951 |
| 2022/0365998 A1* | 11/2022 | Bailey | G06Q 30/01 |

OTHER PUBLICATIONS

Maybery, DJ, et al., "The positive event scale: Measuring uplift frequency and intensity in an adult sample," Social Indicators Research, Aug. 2006, vol. 78, No. 1, pp. 61-83.

Maybery, DJ, et al., "The Negative Event Scale: Measuring frequency and intensity of adult hassles," Anxiety, Stress, and Coping, Jun. 1, 2007, vol. 20, No. 2, pp. 163-176.

Stone, PJ et al., "The General Inquirer: A Computer Approach to Content Analysis," [online] MIT Press, 1966 [retrieved Dec. 28, 2021], retrieved from the Internet:<http://www.wjh.harvard.edu/~inquirer/server_blognote.html>, 6 pg.

Stone, PJ et al., "General Inquirer: Descriptions of inquirer categories and use of inquirer dictionaries" [online] Harvard University, 2002, [retrieved Dec. 28, 2021], retrieved from the Internet: http://www.wjh.harvard.edu/~inquirer/homecat.htm>, 8 pg.

* cited by examiner

EVENT INTENSITY ASSESSMENT

BACKGROUND

This disclosure relates to computer-based systems and techniques for identifying and responding to multi-sourced information generated in response to real-world events.

Advances in communications technologies have dramatically expanded the scope of information available and accelerated the speed with which that information is conveyed to individuals and organizations alike. These advances in many ways and in many areas have been transformative. In the field of finance, for example, seldom any longer does one speak in terms of "bankers' hours," but rather a daily, 'round-the-clock exchange of financial information and rapid movements of capital around the globe. Similarly, rapid communication and data processing have facilitated the development of just-in-time production and delivery of real goods. Advances in communications technologies also have given rise to new communication venues—such as the 24-hour news channels and social networking sites—that contribute to the vast amounts of up-to-the-minute information available to individuals and organizations daily.

SUMMARY

In one or more embodiments, a method for assessing event intensity can include detecting an event description within textual input received via a data communication network. The event can be detected using a text classification model pretrained to classify textual input according to event type. The method can include generating an event-correlated data structure based on the event, wherein the event-correlated data structure includes an event descriptor corresponding to the event. The method can include determining an event sentiment based on the event descriptor and event impact based on a quantitative temporal-spatial measure corresponding to the event. The method can include determining an event intensity based on the event sentiment and event impact and modifying a graphical user interface (GUI) in response to the event intensity exceeding a predetermined threshold. The GUI can indicate the event and the intensity of the event.

In one or more embodiments, a system includes a processor configured to initiate operations. The operations can include detecting an event description within textual input received via a data communication network. The event can be detected using a text classification model pretrained to classify textual input according to event type. The operations can include generating an event-correlated data structure based on the event, wherein the event-correlated data structure includes an event descriptor corresponding to the event. The operations can include determining an event sentiment based on the event descriptor and event impact based on a quantitative temporal-spatial measure corresponding to the event. The operations can include determining an event intensity based on the event sentiment and event impact and modifying a graphical user interface (GUI) in response to the event intensity exceeding a predetermined threshold. The GUI can indicate the event and the intensity of the event.

In one or more embodiments, a computer program product includes one or more computer readable storage media having instructions stored thereon. The instructions are executable by a processor to initiate operations. The operations can include detecting an event description within textual input received via a data communication network. The event can be detected using a text classification model pretrained to classify textual input according to event type. The operations can include generating an event-correlated data structure based on the event, wherein the event-correlated data structure includes an event descriptor corresponding to the event. The operations can include determining an event sentiment based on the event descriptor and event impact based on a quantitative temporal-spatial measure corresponding to the event. The operations can include determining an event intensity based on the event sentiment and event impact and modifying a graphical user interface (GUI) in response to the event intensity exceeding a predetermined threshold. The GUI can indicate the event and the intensity of the event.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
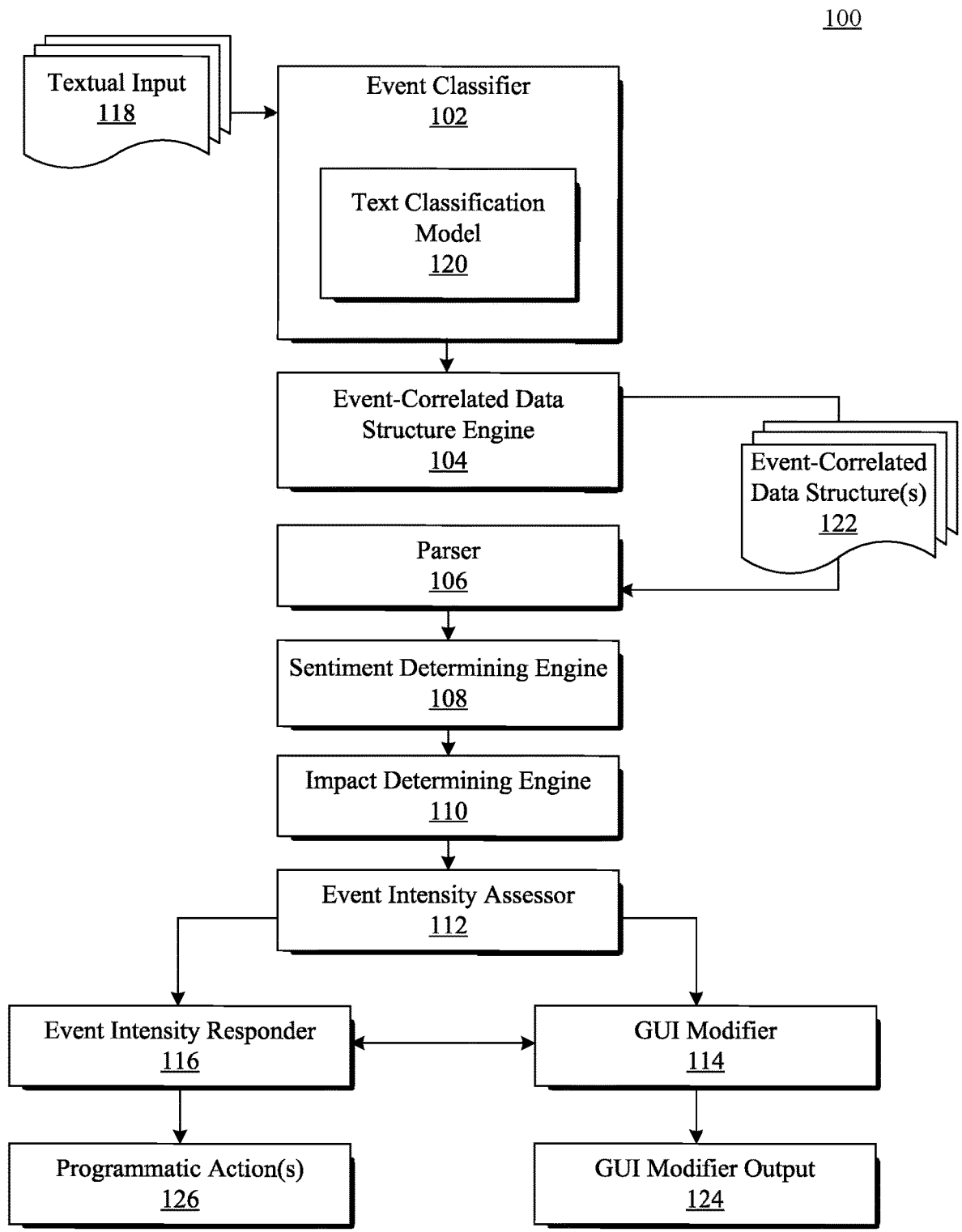
FIG. 1 illustrates an example event intensity assessment system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to computer-based systems and techniques for identifying and responding to multi-sourced information generated in response to real-world events. The increasing amounts of information from sources such as 24-hour news feeds, social media, technical and professional journals, and the like provide many benefits both to individuals and to organizations. Organizations, for example, engaged in diverse fields such as finance, supply chain management, and emergency preparedness benefit by being able to respond rapidly and appropriately to up-to-date information. And yet, the sheer volume and rapid pace with which all types of information are disseminated poses a challenge.

There is an inevitable problem of separating so-called wheat from chaff—that is, determining which information warrants immediate attention and which can be ignored, at least for the moment. The greater the volume, the greater the likelihood that important information may be overlooked. More fundamentally, human-based determinations of the importance of information are inevitably subjective to one degree or another.

The systems, methods, and computer program products disclosed herein are capable of automating the classification of events and generating automatic responses to events identified as impactful. An aspect of the systems, methods, and computer program products disclosed herein is the determination of event intensity. "Event," as defined herein, refers to a real-world occurrence, condition, or state. Relatedly, as also defined herein, "event intensity" refers to a qualitative and/or quantitative measure, according to a predetermined scale, of the importance and/or immediacy of the real-world occurrence, condition, or state.

Events can be domain specific, such that each domain-specific event is related to the other events of the specific domain because of their relevance to the same entity or because they are of the same type. For example, domain-specific financial transactions can be of the same type (e.g., mergers and acquisitions) or of interest to a specific organization or set of organizations (e.g., investment bank). Domain-specific events can be related hierarchically based on the type of the events. For example, events related to a specific occurrence, condition, or state (e.g., prices of certain products) may be a sub-group of a larger group (e.g., product shipments) that includes one or more other groups at the same or a different level of a hierarchy (supply chain events).

The systems, methods, and computer program products disclosed herein are capable of determining an event set intensity based on characteristics of a set of events, as well as an event-specific intensity of each event of an event set. A measure of event intensity can be scaled based on a temporal intensity, according to the number of related events occurring within a predetermined span of time. Another measure of event intensity can be scaled based on a spatial intensity, according to the number of related events occurring with a prespecified geographical area.

In certain arrangements, a system can detect an event based on textual input using a machine learning model (e.g., deep learning neural network) that classifies events according to type. The system can generate an event-correlated data structure that includes an event descriptor and can use natural language processing (NLP) to determine an event sentiment associated with the event. The system can determine an event impact based on a quantitative temporal-spatial measure corresponding to the event and based on related events of an event set containing the event. An event intensity can be determined by the system based on the event sentiment and event impact. In response to the event intensity exceeding a predetermined threshold, the system can invoke one or more programmatic actions. The system, in certain embodiments, responds to the event intensity by generating a visualization, a graphical user interface (GUI) display, alerting a viewer to an event occurrence, describing the event, or recommending an action based on the event intensity. In certain embodiments, the system generates an alarm indicating an event whose event intensity exceeds the predetermined threshold. In other embodiments, the system generates an action recommendation related to the event. In still other embodiments, as described below, the system invokes an action automatically in response to determining that the event intensity exceeds the predetermined threshold.

An aspect of the systems, methods, and computer program products disclosed herein is the coupling of temporal and spatial measurements of related events with NLP and machine learning to determine event intensity. Event intensity thus measures more than merely a count of related events along a time or space dimension but additionally includes sentiment, entity, and other factors acquired through NLP coupled with machine learning. For example, in the domain-specific context of emergency management, a set of events corresponding to a natural disaster may generate a number of reports regarding related events of shortages of needed supplies. Nonetheless, an event portending an imminent collapse of a critical bridge is determined based on NLP and machine learning to have a higher event intensity. Thus, the systems, methods, and computer program products disclosed herein are able to generate a response to the critical event and to direct resources to where, at the moment, the resources are most needed based on event intensity.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 2:
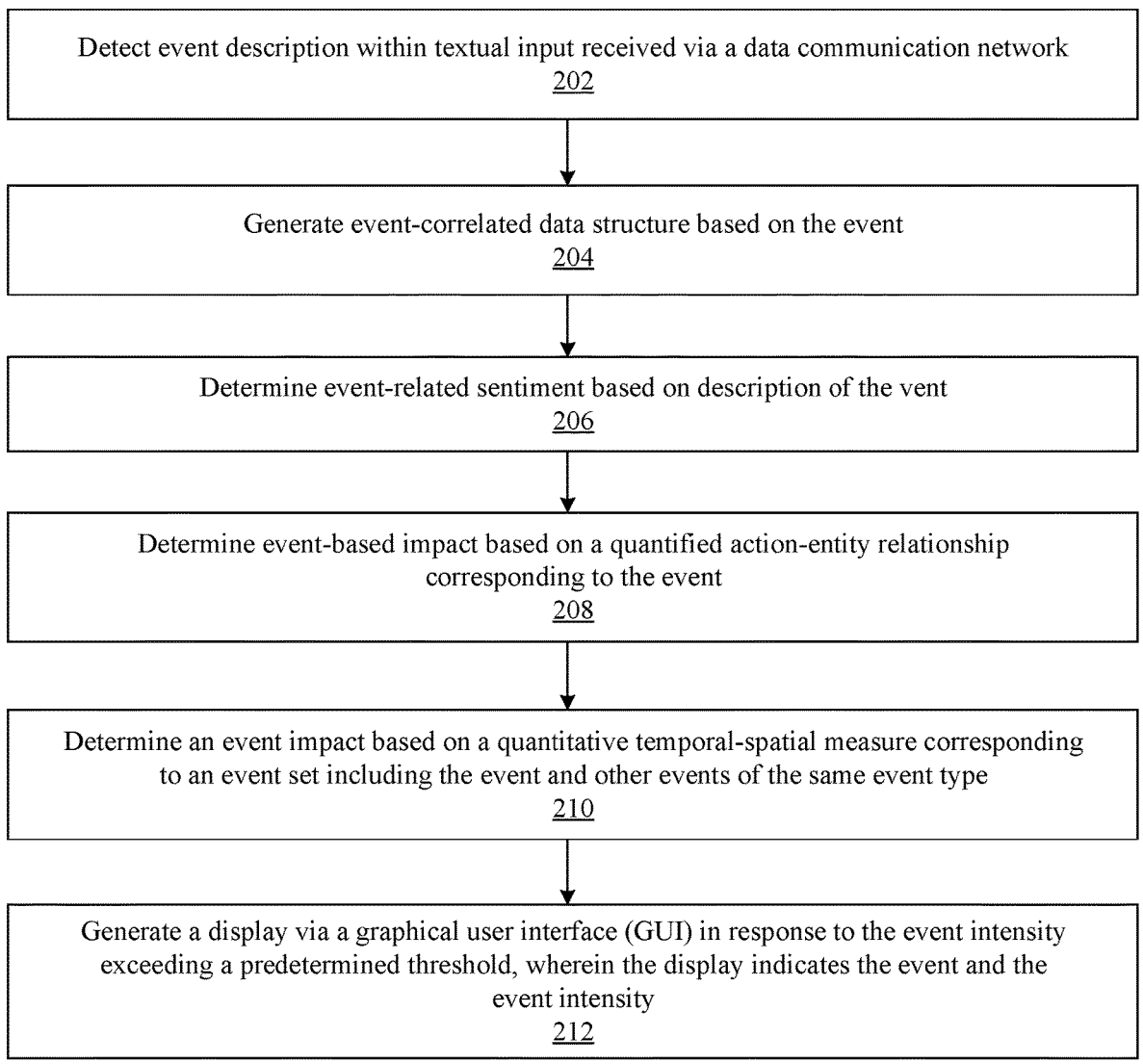
FIG. 2 illustrates a method performed by the system of FIG. 1 for assessing the intensity of an event.
Figure 6:
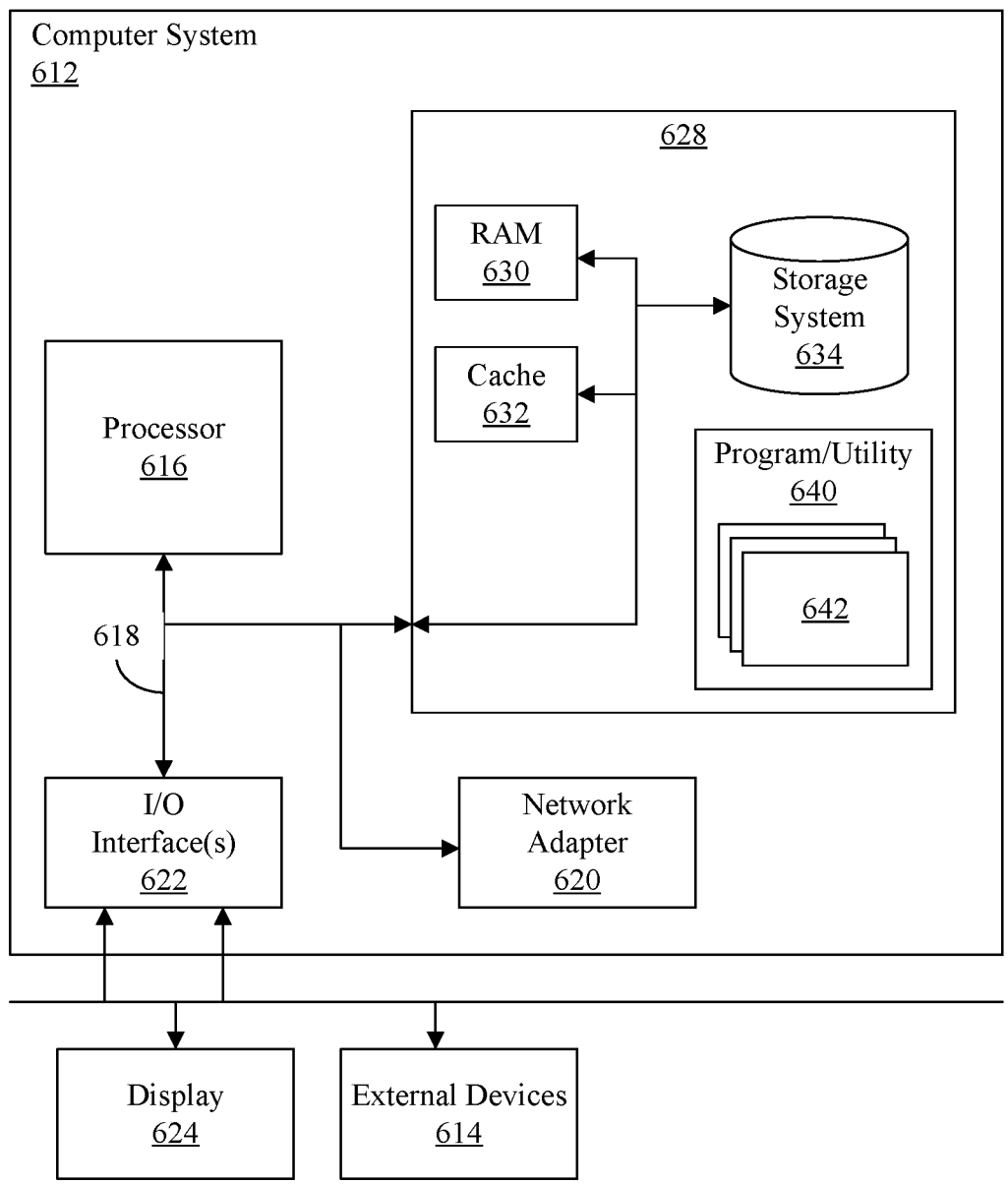
FIG. 6 illustrates an example computing node for implementing the system of FIG. 1.

FIGS. 1 and 2, respectively, illustrate example event intensity assessment (system) 100 and methodology 200 performed by system 100 for assessing the intensity of events. System 100 illustratively includes event classifier 102, event-correlated data structure (ECDS) engine 104, parser 106, sentiment determining engine 108, impact determining engine 110, event intensity assessor 112, GUI modifier 114, and event intensity responder 116. In various embodiments, event classifier 102, ECDS engine 104, parser 106, sentiment determining engine 108, impact determining engine 110, event intensity assessor 112, GUI modifier 114, and event intensity responder 116 of system 100 can be implemented in hardware (e.g., dedicated hardwired circuitry), software (e.g., program code executed by one or more processors), or a combination thereof. For example, system 100 in certain embodiments is implemented in a computing node, such as computing node 600 (e.g., cloud-based server), in which system 100 comprises program code that is electronically stored in a memory, such as memory 628, and executes on one or more processors, such as processor 616 of computer system 612 (FIG. 6).

At block 202, event classifier 102 of system 100 is capable of detecting one or more event descriptions within textual input 118. Textual input 118 can be received from one or more information sources and can include news feeds, social network postings, message exchanges over a private enterprise-specific platform, or various types of information disseminated over one or more data communication networks. The data communication networks can include a wide-area network (WAN), local area network (LAN), the Internet, or other type of data communication network. The computing node or other device in which system 100 is implemented can connect to the one or more data communication networks via wired and/or wireless communications for receiving by event classifier 102 the various types of information comprising textual input 118.

Event classifier 102, in certain arrangements, implements text classification model 120 for identifying predefined events within textual input 118 and classifying the events according to type. Text classification model 120, in some arrangements, is a machine learning model such as a deep learning neural network that is trained through supervised learning using a training set of labeled examples. Events classified according to type by text classification model 120 can comprise an event set, $E=\{e_1, e_2, \ldots, e_N\}$. The event set $E=\{e_1, e_2, \ldots, e_N\}$, classified according to type, can comprise a domain-specific data set of certain type of event. For example, the domain may pertain to finance, and the events may be specific to financial transactions involving mergers and acquisitions. Text classification model 120 thus may be trained to recognize key words or phrases in textual input 118 such as "bid," "tender offer," "hostile takeover," and similar words and phrases containing the words. Event classifier 102 can also be configured to implement NLP techniques capable of grouping related words based on the semantic similarity of the words. For example, if trained to classify the word "bid," then event classifier 102 likewise can recognize the word "offer" based on the semantic similarity of the two words.

At block 204, ECDS engine 104 of system 100 is capable of generating one or more event-correlated data structures 122 based on one or more identified events $e_1, e_2, \ldots, e_N$. Event-correlated data structure(s) 122 generated by ECDS engine 104 can comprise an event descriptor. The event descriptor can comprise a natural language or other type of description of the event. Event-correlated data structure(s) 122, in certain arrangements, also can include a time element and/or spatial element. In some arrangements, event-correlated data structure(s) 122 are generated in real time as each event is extracted from textual input 118 and classified by event classifier 102. The time element can indicate a timing corresponding to the event, and the spatial element can indicate a location corresponding to the event. In certain arrangements, event-correlated data structure(s) 122 for each event $e_i$ can be represented by a vector, matrix, or higher-order tensor. For example, if each event includes a time and spatial element, as well as the descriptor, the i-th event's event-correlated data structure can comprise a three-element tensor $\langle descriptor_i, time_i, location_i \rangle$, where $descriptor_i$ also can be a vector (e.g., row or column vector), matrix, or higher-order tensor as needed to accommodate the form of the description of the event.

Figure 3A:
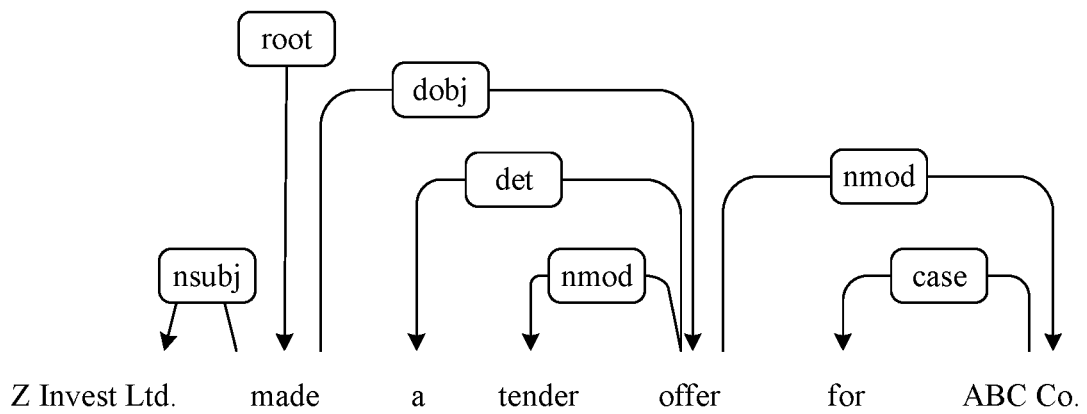
FIGS. 3A and 3B are examples of dependency parsing of textual input.
Figure 3B:
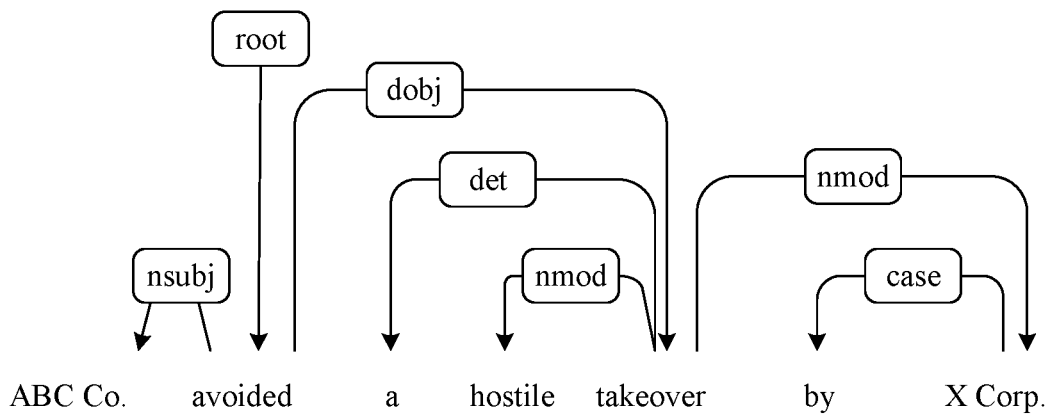

Parser 106 parses descriptor of the corresponding event $e_i$. Parser 106, for every natural language descriptor of an event, parser 106 can perform a dependency parsing that recognizes a sentence and determines the syntactical structure. FIGS. 3A and 3B illustrate the dependency parsing by parser 106 for two example sentences. For the example sentence of FIG. 3A—"Z Invest Ltd. Made a tender offer for ABC Co."—the action is the verb "made" and depends from the root, while the object (dobj) is "offer" with dependent modifier (nmod) "tender" depending from the object. For the example sentence of FIG. 3B—"ABC Co. avoided a hostile takeover by X Corp."—the action is the verb "made," which depends from the root, and the object (dobj) is "takeover," from which dependent modifier (nmod) "hostile" depends.

For both example sentences, parser 106 identifies the entities that perform the action as well as the entities at which the action is directed.

At block 206, using the parsing performed by parser 106, sentiment determining engine 108 of system 100 is capable of determining one or more event sentiments associated with event $e_i$ based on descriptor corresponding to the event. Sentiment determining engine 108, in certain arrangements, implements a domain-specific analyzer which can determine sentiment of an event based on certain key terms (e.g., words and/or phrases) of $descriptor_i$. In some arrangements, sentiment determining engine 108 implements one or more NLP techniques for determining from words and phrases different emotions (e.g., anxious, angry, sad, joyful, fearful), moods (e.g., cheerful, gloomy, irritable, listless, buoyant, depressed), attitudes (e.g., liking, loving, hating, valuing, desiring), and/or other sentiments. Using a machine learning model (e.g., deep learning neural network, naïve Bayesian, support vector machine, linear regression), sentiment determining engine 108 can measure the polarity (e.g., positive, negative, neutral) of words and phrases, as well as the strength of the sentiment expressed (e.g., strong or weak, active or passive, overstated or understated).

A machine learning model implemented by sentiment determining engine 108 can be domain specific. Accordingly, in the example context of FIGS. 3A and 3B, the machine learning model can be trained using an appropriate training set of labeled words and/or phrases to identify terms such as "bid," "tender offer," and "hostile takeover." Each classification, moreover, can be associated with a predefined scale such that certain classifications attach a corresponding value to words and phrases depending on the classification of the words and phrases. Thus, for example, given the sentiment of anxiousness or urgency attached to an action described in the domain-specific context of mergers and acquisitions by "hostile takeover," the words may be accorded a higher value (used in determining overall intensity of event) than "tender offer." Similarly, an event characterized by an event descriptor containing the natural language phrase "there will be a day of reckoning" may be afforded a high value than the phrase "they willingly walked away from the deal." Thus, an event-related sentiment value $v_i$ for an event $e_i$ can correspond to the sentiment determined by sentiment determining engine 108 from the corresponding, $descriptor_i$, of the event.

At block 208, impact determining engine 110 of system 100 is capable of determining an event-based impact of event $e_i$. The event-based impact can be based on a quantified temporal-spatial measurement corresponding to event $e_i$. Recalling that for each of the events $e_1, e_2, \ldots, e_N$ of event set E, of a given type, the i-th event's event-correlated data structure can comprise a three-element tensor $\langle descriptor_i, time_i, location_i \rangle$, which includes a temporal element and a spatial element as well as a descriptor. In certain arrangements, impact determining engine 110 determines the event-based impact of an event $e_i$ based on a temporal-spatial measure. The temporal-spatial measure measures the number of related events of the same type as event $e_i$ that have occurred (indicated by $time_i$) within a predetermined time span. For example, in the domain-specific context of finance, given a considerable amount of reporting on a potential financial transaction within a relatively brief time span, the greater the potential impact the transaction is likely to have. The greater the number, the greater the probability that each single event, $e_i$, of the given type is impactful. Similarly, if the number of events of the given type have occurred within a relatively concentrated area or location (indicated by location for event $e_i$) rather than widely dispersed, the greater the probability that each single event, $e_i$, of the given type is impactful. For example, in the domain-specific context of supply chain management, the greater the reports of product shortages in a relatively concentrated area, the greater the potential impact of a single supply chain-related event. Based on a predetermined scale, an event-based impact value $u_i$ for an event $e_i$ can be determined based on the temporal-spatial measure.

At block 210, event intensity assessor 112 is capable of providing an event intensity assessment of event $e_i$. Event intensity assessor 112 can determine an event intensity based on the event-related sentiment, determined at block 206 by sentiment determining engine 108, and event-based impact, determined at block 208 by impact determining engine 110. The event intensity can also be a numerical value, the value determined from event-related sentiment value $v_i$ and event-based impact value $u_i$. The value $e_i(T,S)$ for a single event given the event type T and predetermined scale S is an event-specific intensity. In some arrangements, $e_i(T,S)$ is a weighted sum of event-related sentiment value $v_i$ and event-based impact value $u_i$, $e_i(T,S)=w_S v_i + w_I u_i$, where $w_S$ is a weighting factor applied to event-related sentiment value $v_i$ for event $e_i$, and $w_I$ is a weighting factor applied to event-based impact value $u_i$ for event $e_i$. The scale S can be a continuous or discrete (e.g., S=1, 2, . . . , 10) numerical score or a qualitative score (e.g., low intensity, medium intensity, high intensity).

At block 212, GUI modifier 114 is capable of generating one or more GUI visualizations on one or more displays of one or more devices communicatively coupled with the computing node or other device in which system 100 is implemented. A GUI visualization can be generated by GUI modifier 114 in response to a determination by system 100 that an event intensity of an event exceeds a predetermined threshold. GUI modifier 114 can generate and convey an alert to one or more entities (e.g., subscriber organizations and/or individuals) in response to the determination that the event intensity of the event exceeds a predetermined threshold. If the scale S is a continuous or discrete (e.g., S=1, 2, . . . , 10) numerical score, then the value $e_i(T,S)$ exceeds a predetermined threshold if $e_i(T,S)$ exceeds a predetermined value on S. If scale S is a qualitative score (e.g., low intensity, medium intensity, high intensity), then $e_i(T,S)$ exceeds the threshold if the value of $e_i(T,S)$ is within a range greater than that corresponding to a predetermined qualitative measure (e.g., low intensity, medium intensity, high intensity) and within a range corresponding to qualitative measure indicating a significant intensity (e.g., high rather than low or medium). The GUI visualization generated by GUI modifier 114 can indicate or display both the event and the event intensity.

Optionally, the GUI modifier 114 in response to the event intensity exceeding a predetermined threshold can convey an alert to one or more entities via one or more devices connected via wired or wireless connections to the computing node or device in which system 100 is implemented. Additionally, or alternatively, GUI modifier 114 optionally can convey an action recommendation to one or more entities based on the event intensity. For example, the action recommendation can be to take immediate action if, on a qualitative scale, $e_i(T,S)$ is high intensity or continue monitoring if medium intensity or take no action if low intensity.

A GUI visualization generated by GUI modifier 114 can be a visualization of the event set, E, enumerating or otherwise indicating each event of a specific type contained therein. For example, the visualization generated by GUI modifier 114 can display the intensity values for one or more events of the specific type. GUI modifier 114 additionally, or alternatively, can generate an iso-event graph. An iso-event graph connects semantically (or conceptually) similar events into the clusters of aggregated intensity. For example, an iso-event graph can comprise multiple contour lines on a geographic map, the contour lines connecting regions in which events intensities are the same or within a common range of values. An iso-event graph, in some arrangements, displays semantically connected events (e.g., various-sourced news reports) in which the contour lines are highlighted (e.g., differently colored, differently dashed, and/or differently weighted contour lines) according to the respective intensities of events joined by each contour line.

Figure 4:
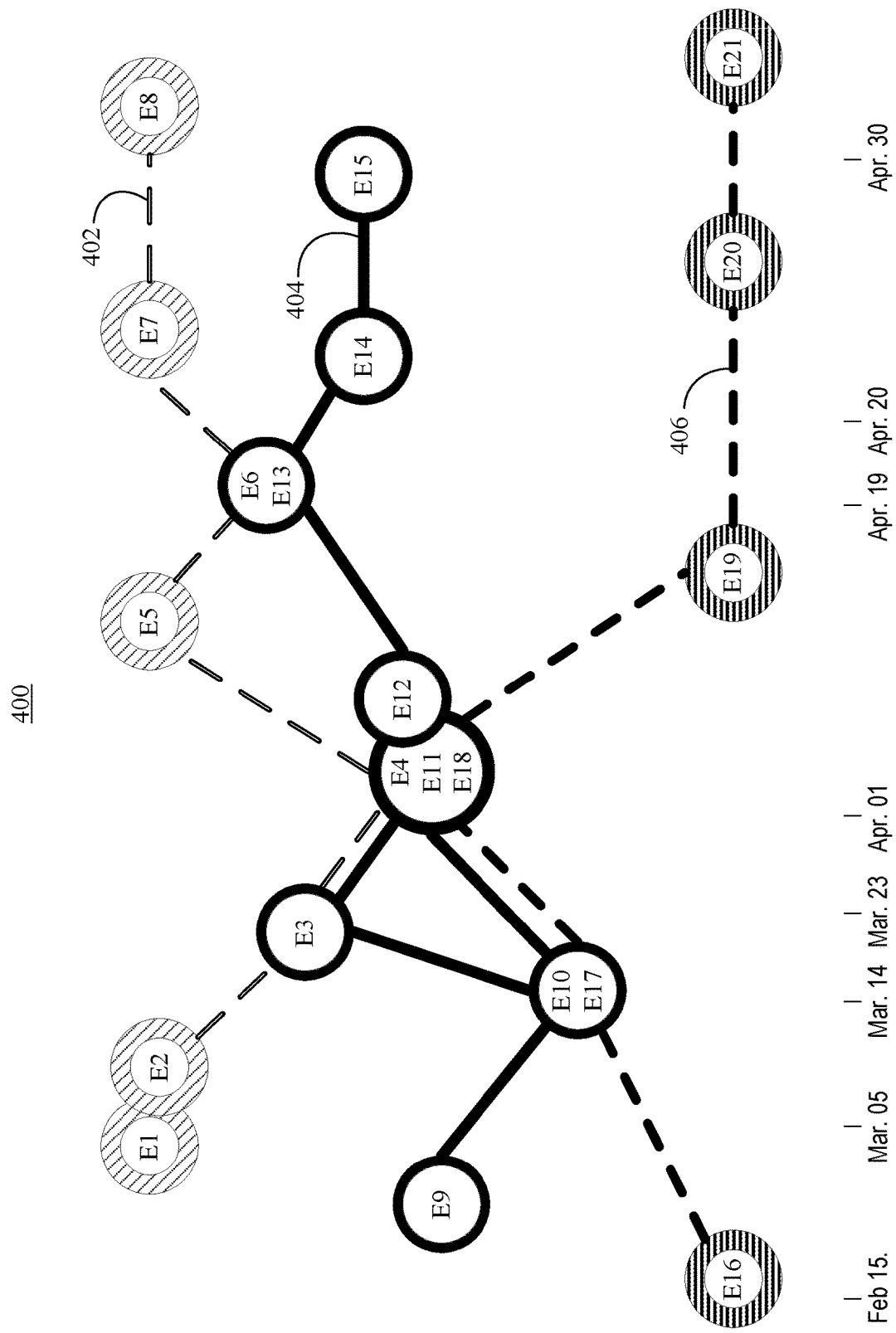
FIG. 4 illustrates an example iso-event graph generated by the system of FIG. 1

FIG. 4 illustrates example iso-event graph 400, which is visually rendered by GUI modifier 114 as GUI modifier output 124 (FIG. 1). Illustratively, iso-event graph 400 displays a map indicating different events, E1 through E21, according to the location and date of each event. Events E1 through E8, having the same intensities or intensities that lie within a predetermined range of values, are connected to form contour line 402. Events E9 through E15 also have the same intensities or intensities whose values are within a specific range and are thus connected by distinct contour line 404. Likewise, contour line 406, also distinguishable from the other contour lines, connects events E16 through E21, which also have the same intensities or intensity values are that are within a predetermined range.

In certain embodiments, GUI modifier 114 can generate one or more animated graphics. For example, an animated graphic can display a time-based accrual of multiple events based on locations of the occurrences of the event, displaying how the number of events increase within a certain time span and either coalesce within a given region of a map or diffuse throughout multiple regions. In still other embodiments, the GUI modifier 114 can generate displays of text explaining the nature of the events and/or the different intensities of events. Given that method 200 implemented by system 100 is a transparent rather than black-box methodology, GUI modifier 114 in yet other embodiments can generate text describing the manner in which the intensities were determined.

Figure 5:
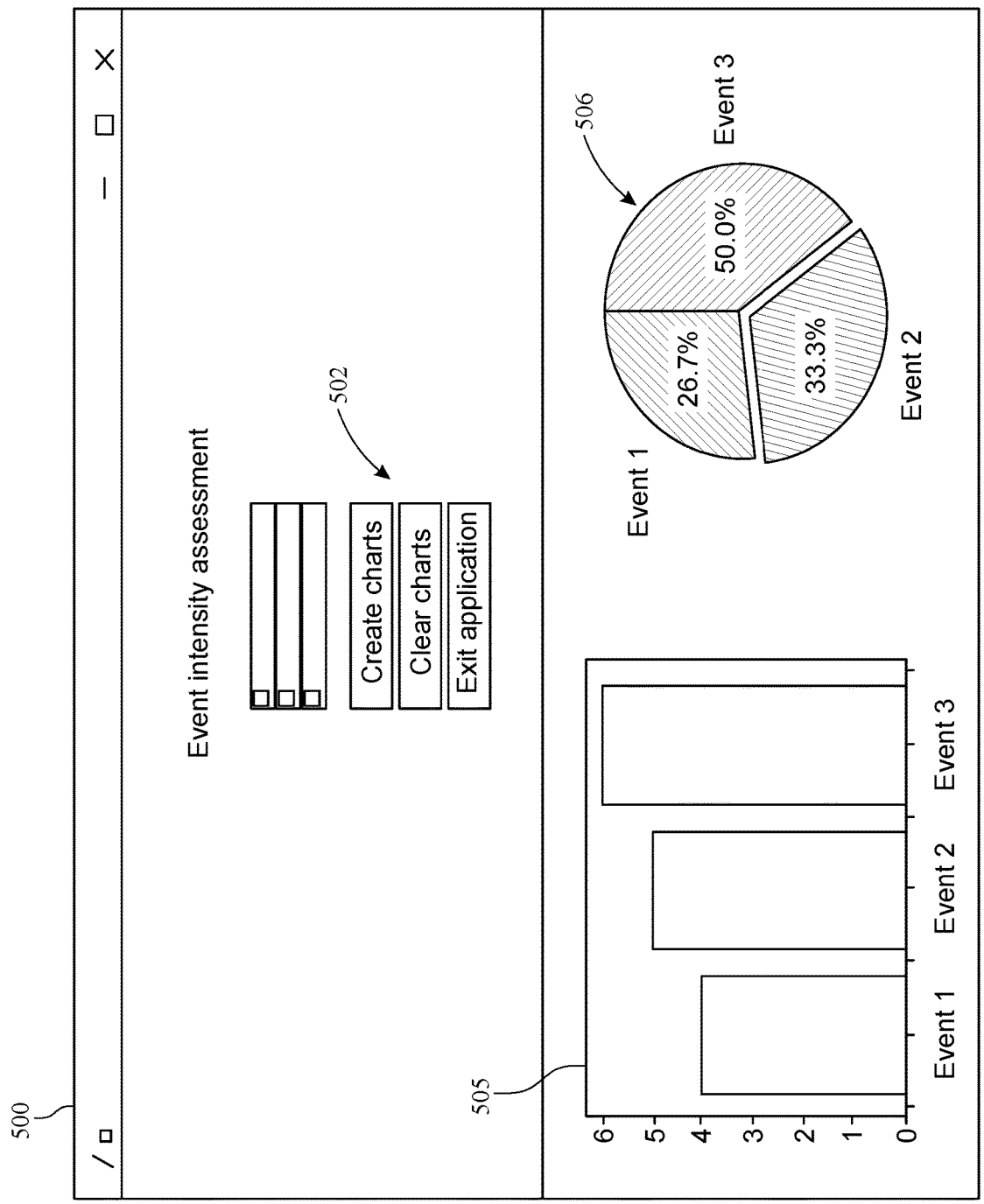
FIG. 5 illustrates an example graphical user interface generated by the system of FIG. 1.

FIG. 5 illustrates example GUI 500 generated by GUI modifier output 124 (FIG. 1). Illustratively, GUI 500 is interactive, enabling a user to select different modifications using point-and-click control buttons 502. As shown, three event intensity values 504 are displayed adjacent chart 506 highlighting the relative intensities of the three events on a normalized scale.

Whereas $e_i(T,S)$ provides an event-specific intensity assessment, optionally system 100 can also provide the relative intensities of each of events $e_1, e_2, \ldots, e_N$ of event set E. The relative intensity of the i-th event, $\tilde{e}_i$ is $$[e_i(T,S)-e_{low}(T,S)]/[e_{high}(T,S)-e_{low}(T,S)],$$

where $e_{high}(T,S)$ and $e_{low}(T,S)$, respectively, are the greatest event intensity value and the least event intensity value of events $e_1, e_2, \ldots, e_N$ of event set E, and where their difference serves to normalize the amount by which the i-th event is greater than the least event intensity value of the set. The relative intensities provide an indication of the relative importance and/or immediacies of each of the events of the event set. Accordingly, in certain arrangements, GUI modifier 114 can display one or more visualizations indicating the relative intensities, such as iso-event graph 400 (FIG. 4) or chart 506 (FIG. 5).

In conjunction with a visualization generated by GUI modifier 114, or independently in response to an event intensity assessment by event intensity assessor 112, event intensity responder 116 can generate a response to an event. Responses generated by event intensity responder 116 can include, for example, an action recommendation. For example, in the domain-specific context of emergency management described above, event intensity responder 116 can respond to the events comprising an event set corresponding to a natural disaster, the response being to generate a recommendation to deploy emergency resources to certain event locations. The event locations can be determined from field reports (textual input) conveyed wirelessly to a device in which system 100 is implemented at a central location. Through the above-described processing by system 100 of the field reports, event intensity assessor 112 can determine the relative event intensities from the reported events. The event intensities thus provide an indication of the relative importance and/or immediacies of each of the location-specific events of the event set. Event intensity responder 116 can generate a recommendation that is included in a visualization generated by GUI modifier 114 recommending that, given a limited amount of emergency resources, the resources by deployed to locations based on the system-determined event intensities.

In some embodiments, event intensity responder 116 responds by initiating one or more programmatic actions. For example, in the domain-specific context of supply chain management described above, system 100 can be integrated in an enterprise-wide automated system for maintaining warehouse inventories in several geographical regions. Textual input to system 100, for example, can comprise numerical indications of prices and/or quantities of certain products. In response to the determination of event intensities at different warehouses in different geographical regions, event intensity responder 116 can automatically respond by initiating a programmatic action directing shipments of the products from a central warehouse to the regional warehouses in various quantities, where the quantities are commensurate with event intensities determined from the received textual input. In various other contexts, other programmatic actions can be initiated automatically, either separate from or in addition to, recommendations generated by event intensity responder 116.

In the domain-specific context of safeguarding large-crowd events (e.g., a sporting event), for example, system 100 can respond to numerous event-related messages indicating, based on temporal- and/or spatial-based event intensities exceeding a predetermined threshold, pockets of congestion or a potential rush of the crowd. In response, event intensity responder 116 can automatically respond by initiating transmission of wireless messages re-directing members of the crowd to avoid the congestion or potential rush of the crowd.

FIG. 6 illustrates a schematic of an example of a computing node 600. In one or more embodiments, computing node 600 is an example of a suitable cloud computing node. Computing node 600 is not intended to suggest any limitation as to the scope of use or functionality of embodiments of the invention described herein. Computing node 600 is capable of performing any of the functionality described within this disclosure.

Computing node 600 includes a computer system 612, which is operational with numerous other general-purpose or special-purpose computing system environments or configurations. Examples of well-known computing systems, environments, and/or configurations that may be suitable for use with computer system 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 612 may be described in the general context of computer system-executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system 612 is shown in the form of a general-purpose computing device. The components of computer system 612 may include, but are not limited to, one or more processors 616, a memory 628, and a bus 618 that couples various system components including memory 628 to processor 616. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 618 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 612 typically includes a variety of computer system-readable media. Such media may be any available media that is accessible by computer system 612, and may include both volatile and non-volatile media, removable and non-removable media.

Memory 628 may include computer system readable media in the form of volatile memory, such as random-access memory (RAM) 630 and/or cache memory 632. Computer system 612 may further include other removable/non-removable, volatile/non-volatile computer system storage media. By way of example, storage system 634 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. For example, one or more of the program modules may include an event intensity assessment system, such as system 100, or portions thereof.

Program/utility 640 is executable by processor 616. Program/utility 640 and any data items used, generated, and/or operated upon by computer system 612 are functional data structures that impart functionality when employed by computer system 612. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via input/output (I/O) interfaces 622. Still, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include, but are not limited to: microcode, device drivers, redundant processing units, external disk drive arrays, RAID systems, tape drives, and data archival storage systems, etc.

While computing node 600 is used to illustrate an example of a cloud computing node, it should be appreciated that a computer system using an architecture the same as or similar to that described in connection with FIG. 6 may be used in a non-cloud computing implementation to perform the various operations described herein. In this regard, the example embodiments described herein are not intended to be limited to a cloud computing environment. Computing node 600 is an example of a data processing system. As defined herein, "data processing system" means one or more hardware systems configured to process data, each hardware system including at least one processor programmed to initiate operations and memory.

Computing node 600 is an example of computer hardware. Computing node 600 may include fewer components than shown or additional components not illustrated in FIG. 6 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 600 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
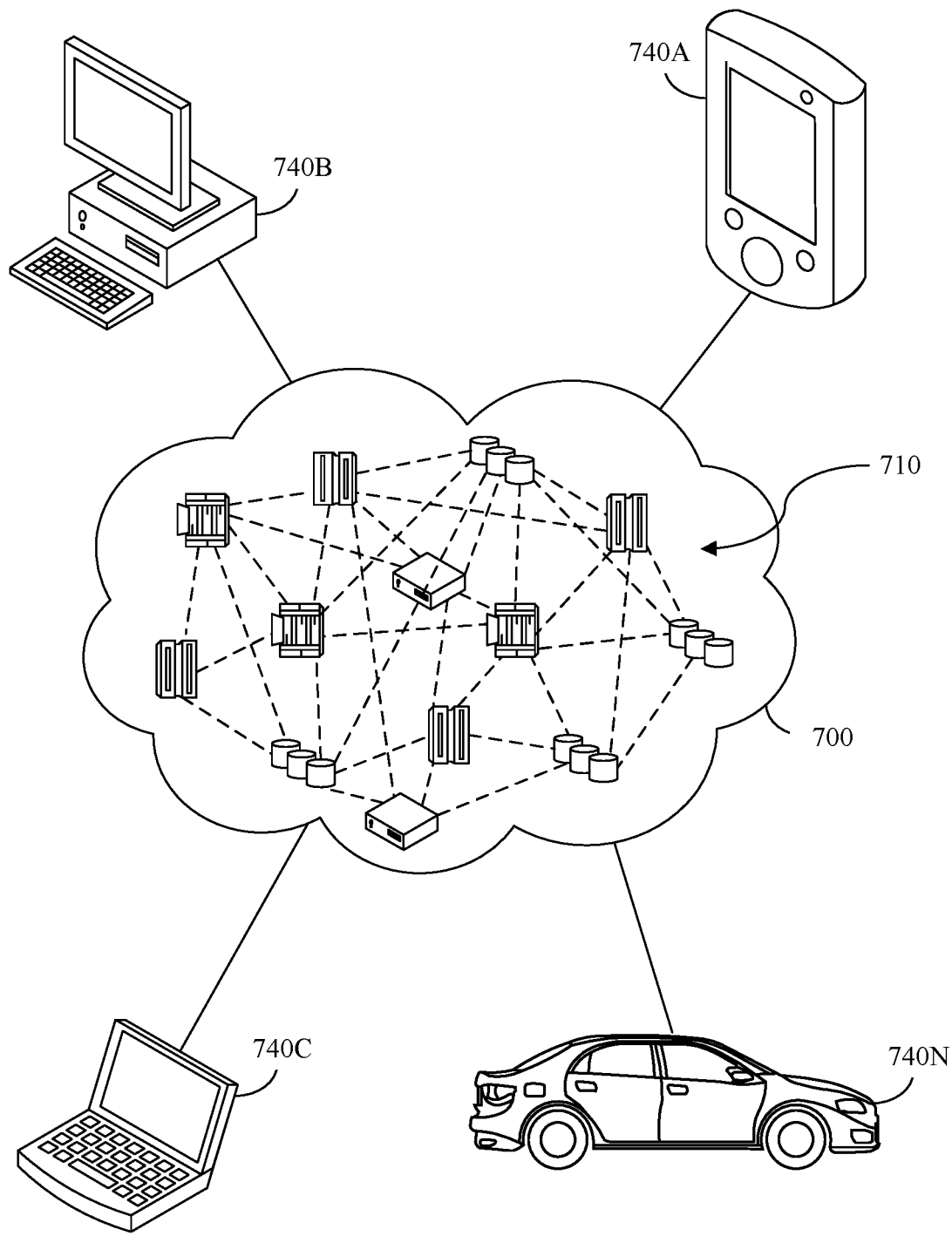
FIG. 7 illustrates an example cloud computing environment.

Referring now to FIG. 7, illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 740a, desktop computer 740b, laptop computer 740c, and/or automobile computer system 740n may communicate. Computing nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 740a-n shown in FIG. 7 are intended to be illustrative only and that computing nodes 710 and cloud computing environment 700 can communicate with any type of computerized device over any type of network and/or network addressable connection (e.g., using a web browser).

Figure 8:
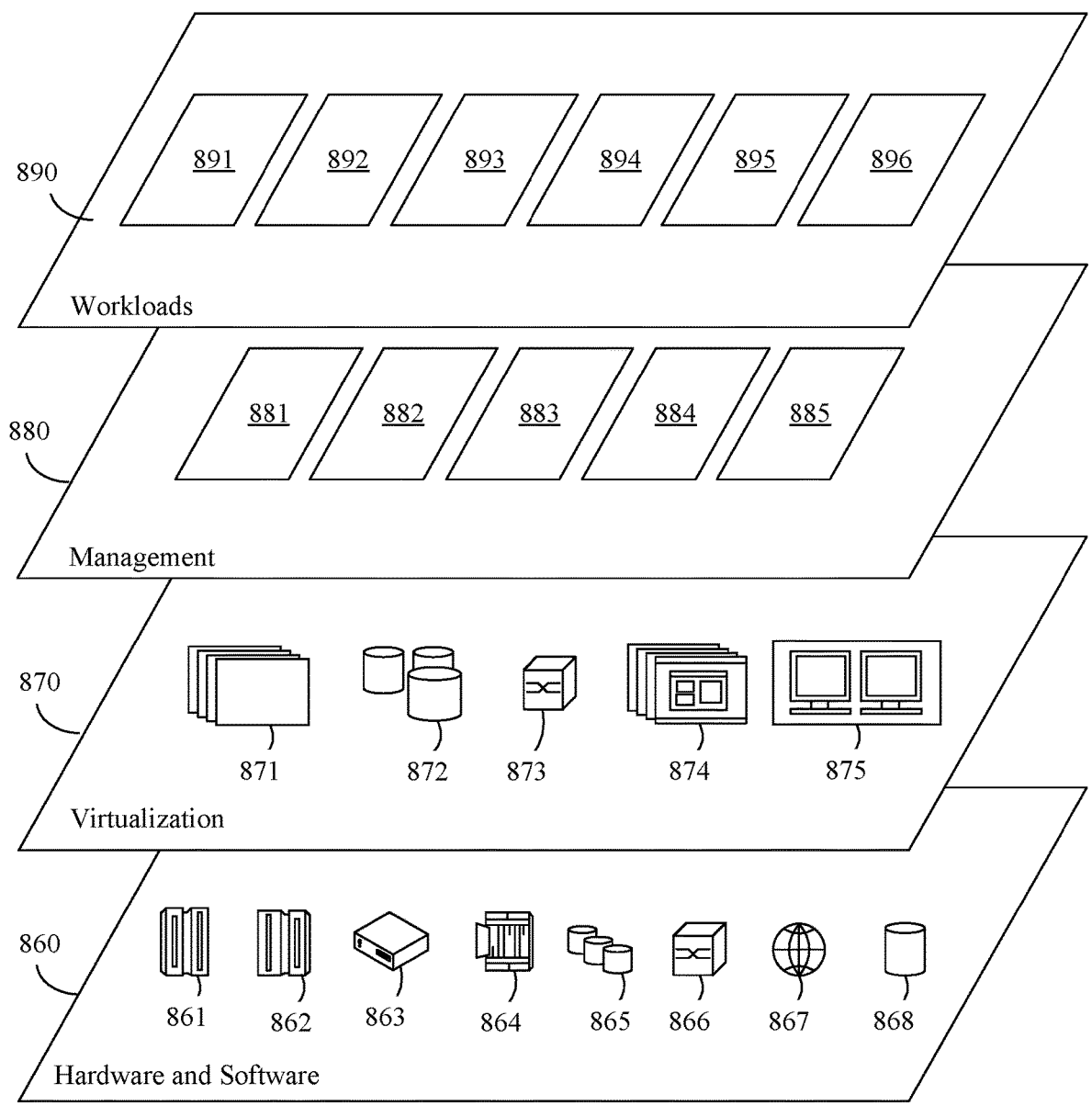
FIG. 8 illustrates example abstraction model layers of the cloud computing environment of FIG. 6.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes 861; RISC (Reduced Instruction Set Computer) architecture-based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and event intensity assessor system 896.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being. "Entity" refers to a single or multiple individuals that collectively form an organization of individuals.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
detecting an event description of an event within textual input received via a data communication network, wherein the event description is detected using a text classification model pretrained to classify textual input according to event type;
generating an event-correlated data structure based on the event, wherein the event-correlated data structure includes an event descriptor corresponding to the event;
determining, using natural language processing, an event sentiment based on the event descriptor;
determining an event impact based on a quantitative temporal-spatial measure corresponding to an event set including the event and other events of a same event type;
determining an event intensity based on the event sentiment and event impact; and
modifying a display generated via a graphical user interface (GUI) in response to the event intensity exceeding a predetermined threshold, wherein the display indicates the event and the event intensity.

2. The method of claim 1, comprising:
generating event-correlated data structures for a plurality of additional events classified by the text classification model as a same type as the event; and
determining a relative intensity of the event and relative intensities of each of the plurality of additional events.

3. The method of claim 1, comprising:
conveying an alert to one or more predetermined entities in response to the event intensity exceeding a predetermined threshold.

4. The method of claim 1, comprising:
conveying an action recommendation to one or more predetermined entities in response to the event intensity exceeding a predetermined threshold.

5. The method of claim 1, wherein
the determining the event intensity comprises determining a sentiment value and an impact value and calculating a weighted sum of the sentiment value and the impact value.

6. The method of claim 1, wherein
the modifying comprises generating at least one of a visualization of the event set including the event and other events of the same type, a visualization of intensity values determined for a plurality of events of the same type, an iso-event intensity graph, or an animated graphic.

7. The method of claim 1, wherein
the modifying comprises generating an explanation of the event intensity determination.

8. A system, comprising:
a processor configured to initiate operations including:
detecting an event description of an event within textual input received via a data communication network, wherein the event description is detected using a text classification model pretrained to classify textual input according to event type;

generating an event-correlated data structure based on the event, wherein the event-correlated data structure includes an event descriptor corresponding to the event;

determining, using natural language processing, an event sentiment based on the event descriptor;

determining an event impact based on a quantitative temporal-spatial measure corresponding to an event set including the event and other events of a same event type;

determining an event intensity based on the event sentiment and event impact; and modifying a display generated via a graphical user interface (GUI) in response to the event intensity exceeding a predetermined threshold, wherein the display indicates the event and the event intensity.

9. The system of claim 8, wherein the processor is configured to initiate further operations including:

generating event-correlated data structures for a plurality of additional events classified by the text classification model as a same type as the event; and determining a relative intensity of the event and relative intensities of each of the plurality of additional events.

10. The system of claim 8, wherein the processor is configured to initiate further operations including:

conveying an alert to one or more predetermined entities in response to the event intensity exceeding a predetermined threshold.

11. The system of claim 8, wherein the processor is configured to initiate further operations including:

conveying an action recommendation to one or more predetermined entities in response to the event intensity exceeding a predetermined threshold.

12. The system of claim 8, wherein the determining the event intensity comprises determining a sentiment value and an impact value and calculating a weighted sum of the sentiment value and the impact value.

13. The system of claim 8, wherein the modifying comprises generating at least one of a visualization of the event set including the event and other events of the same type, a visualization of intensity values determined for a plurality of events of the same type, an iso-event intensity graph, or an animated graphic.

14. A computer program product, the computer program product comprising:

one or more computer-readable storage media and program instructions collectively stored on the one or more computer-readable storage media, the program instructions executable by a processor to cause the processor to initiate operations including:

detecting an event description of an event within textual input received via a data communication network, wherein the event description is detected using a text classification model pretrained to classify textual input according to event type;

generating an event-correlated data structure based on the event, wherein the event-correlated data structure includes an event descriptor corresponding to the event;

determining, using natural language processing, an event sentiment based on the event descriptor;

determining an event impact based on a quantitative temporal-spatial measure corresponding to an event set including the event and other events of a same event type;

determining an event intensity based on the event sentiment and event impact; and modifying a display generated via a graphical user interface (GUI) in response to the event intensity exceeding a predetermined threshold, wherein the display indicates the event and the event intensity.

15. The computer program product of claim 14, wherein the program instructions are executable by the processor to cause the processor to initiate operations further including:

generating event-correlated data structures for a plurality of additional events classified by the text classification model as a same type as the event; and determining a relative intensity of the event and relative intensities of each of the plurality of additional events.

16. The computer program product of claim 14, wherein the program instructions are executable by the processor to cause the processor to initiate operations further including:

conveying an alert to one or more predetermined entities in response to the event intensity exceeding a predetermined threshold.

17. The computer program product of claim 14, wherein the program instructions are executable by the processor to cause the processor to initiate operations further including:

conveying an action recommendation to one or more predetermined entities in response to the event intensity exceeding a predetermined threshold.

18. The computer program product of claim 14, wherein the determining the event intensity comprises determining a sentiment value and an impact value and calculating a weighted sum of the sentiment value and the impact value.

19. The computer program product of claim 14, wherein the modifying comprises generating at least one of a visualization of the event set including the event and other events of the same type, a visualization of intensity values determined for a plurality of events of the same type, an iso-event intensity graph, or an animated graphic.

20. The computer program product of claim 14, wherein the modifying comprises generating an explanation of the event intensity determination.

\* \* \* \* \*